United States Patent
Irie et al.

(10) Patent No.: US 7,403,751 B2
(45) Date of Patent: Jul. 22, 2008

(54) DC OFFSET CALIBRATION SYSTEM

(75) Inventors: Masatake Irie, Takatsuki (JP); Hiroshi Komori, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 507 days.

(21) Appl. No.: 11/246,258

(22) Filed: Oct. 11, 2005

(65) Prior Publication Data

US 2006/0084386 A1    Apr. 20, 2006

(30) Foreign Application Priority Data

Oct. 14, 2004   (JP)   ............................. 2004-299695

(51) Int. Cl.
*H04B 1/10*   (2006.01)
*H04B 1/26*   (2006.01)

(52) U.S. Cl. .................. 455/130; 455/296; 455/315; 455/319; 375/319

(58) Field of Classification Search ......... 455/283–284, 455/293, 295, 296, 313–319, 323–326; 375/317–319
See application file for complete search history.

(56) References Cited

U.S. PATENT DOCUMENTS

| | | | | |
|---|---|---|---|---|
| 6,535,725 | B2 * | 3/2003 | Hatcher et al. | 455/317 |
| 6,642,767 | B2 * | 11/2003 | Wang | 327/307 |
| 2005/0239428 | A1 * | 10/2005 | Seendripu et al. | 455/280 |
| 2006/0073803 | A1 * | 4/2006 | Igarashi et al. | 455/296 |

* cited by examiner

*Primary Examiner*—Simon D Nguyen
(74) *Attorney, Agent, or Firm*—Dickinson Wright, PLLC

(57) ABSTRACT

A division ratio of a first frequency divider that generates a local signal and a division ratio of a second frequency divider that generates a RF interfering signal are different, and a first frequency synthesizer that generates the local signal and a second frequency synthesizer that generates the RF interfering signal employ an identical reference signal. The second frequency synthesizer that generates the RF interfering signal is not provided with a frequency switching function.

11 Claims, 6 Drawing Sheets

DC OFFSET CALIBRATION SYSTEM

BACKGROUND OF THE INVENTION

1. Field of the Invention

The present invention relates to a DC offset calibration system that corrects a DC offset which emerges when an interfering signal is input in a direct conversion type radio receiver.

2. Description of the Related Art

Existing mobile phones include a dual band mobile phone compatible with signals of two different frequency bands, for example bandwidths of 880 to 915 MHz allocated to GSM (Global System for Mobile Communication) and 1710 to 1785 MHz allocated to DCS (Digital Cellular System). Some of such dual band mobile phones include a frequency synthesizer so as to handle two frequency bands by switching the frequency of a local signal.

Lately, however, there is a growing demand for a triple band mobile phone that is compatible with signals of 1850 to 1915 MHz allocated to PCS (Personal Communication System), in addition to the GSM and DCS. Thus, compatibility with still more frequency bands will be required from the mobile phone in the near future. For demodulating a signal received by a radio equipment compatible with a plurality of frequency bands, it is advantageous to employ a direct conversion type high-frequency semiconductor IC, from the viewpoint of micronization in dimensions of the radio equipment and manufacturing cost. The direct conversion system eliminates the need to provide an intermediate frequency filter, since a RF input signal is directly converted into a low-frequency base band signal, unlike a conventional system which requires the intermediate frequency.

The frequency conversion is performed by mixing a RF input signal and a local signal of the same frequency as the RF input signal frequency, in a mixer circuit. Under the direct conversion system, however, if a secondary nonlinear distortion is present in the mixer circuit, a DC offset emerges in an output base band signal when the level of the input signal is high. Such phenomenon will be described in details referring to FIGS. 4 and 5.

FIG. 4 shows a spectrum of a RF input signal. In FIG. 4, reference numeral 501 designates a low level desired signal having a center frequency equal to a local signal frequency $f_{Lo}$, and 502 designates a high-level interfering signal having a higher frequency $f_{INT}$. When the RF input signal accompanied with such high-level interfering signal is input to a mixer circuit, the spectrum of the output signal as shown in FIG. 5 appears in the output of the mixer. In FIG. 5, numerals 601, 602 respectively designate the components of the desired signal and the interfering signal generated as the mixer output upon frequency-conversion of the RF input desired signal 501 and the interfering signal 502. Numeral 603 designates a DC offset generated by the high-level interfering signal when a secondary nonlinear distortion is present in the mixer circuit. Accordingly, the direct conversion system has a drawback that the receiving sensitivity is degraded because of the presence of the DC offset 603 in the frequency band of the desired signal 601 in the mixer output. Provided that the mixer circuit is constituted of a differential circuit in a perfectly symmetrical differential balance, a secondary nonlinear distortion is not generated. However, the perfect symmetry of the elements constituting the differential circuit cannot be practically achieved because of manufacturing variation among individual units, and hence it is impossible to eliminate the secondary nonlinear distortion.

To solve this problem, a technique of correcting the DC offset generated by the secondary nonlinear distortion has been proposed.

Referring now to FIG. 6, description will be made on the technique of detecting an interfering signal contained in a RF input signal, to thereby correct a DC offset generated in a mixer output, according to patented document 1. In FIG. 6, numeral 403 designates a mixer circuit, and 401, 402 a switching cell and a RF input cell constituting the mixer circuit 403, respectively. The RF input signal input from RF input terminals 413, 414 is amplified in the RF input cell 402, and the amplified RF signal is mixed with a local signal input from local input terminals 411, 412, in the switching cell 401, thus to be converted to an IF signal. The IF signal thus converted is output from output terminals 409, 410. The direct conversion system is also called a "zero IF system", since the center frequency of the IF signal is a direct current.

The switching cell 401 includes bipolar transistors Q1, Q2, Q3 and Q4. If all the transistors Q1, Q2, Q3 and Q4 were of an identical characteristic, the differential circuit would have a perfectly symmetrical balance. Practically, however, the transistors Q1, Q2, Q3 and Q4 have a different characteristic from one another shifted from an ideal characteristic, because of the manufacturing variation. This leads to generation of the secondary nonlinear distortion during the conversion of the RF input signal to the IF signal, which results in generation of the DC offset in the mixer output as shown in FIG. 6. As is commonly known, the DC offset is proportionate to the square of the input signal intensity, and hence the DC offset in the output becomes greater when the level of the interfering signal contained in the input signal is higher.

In FIG. 6, numeral 408 designates a DC offset corrector. The DC offset corrector 408 includes a detector 406 that detects the RF input signal and outputs a detecting signal, a controller 405 that outputs a control signal according to the detecting signal, and a correction generator 404 that generates a correction signal according to the control signal from the controller so as to reduce the DC offset in the mixer output terminals 409, 410. The DC offset corrector 408 serves to cause variation of the correction signal according to the intensity of the RF signal input to the mixer circuit 403, thus to cancel the DC offset in the mixer output.

Here, the secondary nonlinear distortion in the mixer circuit 403 is different, owing to the manufacturing variation. Since the mixer circuit 403 has a different characteristic among individual units, DC offset corrector 408 also serves as a user interface 407 for adjusting the control signal generated by the controller 405.

[Patented document 1] U.S. Pat. No. 6,535,725

In such a DC offset calibration system, an additional frequency synthesizer for generating an interfering signal is indispensable, apart from a frequency synthesizer that generates a local signal. The two frequency synthesizers have to oscillate in very close frequencies to each other, in order to satisfy the interfering signal standard of a desired radio system. In this case, interference emerges in the respective voltage control oscillators, which causes degradation in C/N (carrier/noise) characteristic and emergence of a spurious, thus impeding adequately precise DC offset calibration.

Also, incorporating such a DC offset calibration system in a radio system is against the demand for further micronization and cost reduction of the radio system.

Further, a radio system that operates in a plurality of bands includes the same number of mixers corresponding to the respective bands. Accordingly, each of the mixers have to be individually calibrated for the DC offset, for the same reason.

Consequently, an interfering signal of a different frequency has to be input to each of the mixers.

SUMMARY OF THE INVENTION

Accordingly, it is a first object of the present invention to provide a DC offset calibration system capable of precisely canceling a DC offset.

A second object of the present invention is to provide a small and inexpensive DC offset calibration system, which can effectively work even in a radio system including a plurality of mixers that operates in different frequencies.

In the DC offset calibration system for achieving the first object, a first frequency divider that generates a local signal and a second frequency divider that generates an interfering-signal are different in division ratio. Such configuration allows the DC offset calibration system to precisely cancel the DC offset.

In the DC offset calibration system for achieving the second object, a first frequency synthesizer that generates a local signal and a second frequency synthesizer that generates an interfering signal employ an identical reference signal, and the second frequency synthesizer that generates the interfering signal does not have a frequency switching function. Such configuration enables providing a small and inexpensive DC offset calibration system.

More specifically, a first aspect of the present invention provides a DC offset calibration system comprising a mixer that mixes a local signal and a RF interfering signal thus to output an IF signal; a DC offset corrector that detects a level of the RF interfering signal and outputs to the mixer a correction signal to correct a DC offset contained in the IF signal to thereby cancel the DC offset; a first and a second frequency synthesizers; a first frequency divider that divides the frequency of an output signal of the first frequency synthesizer to thereby generate the local signal and outputs the local signal to the mixer; and a second frequency divider that divides the frequency of an output signal of the second frequency synthesizer to thereby generate the RF interfering signal and outputs the RF interfering signal to the mixer. The first frequency divider and the second frequency divider have different division ratios.

Here, when the division ratio of the first frequency divider is 1, the first frequency divider may be constituted of a line that transmits the output signal of the first frequency synthesizer to the mixer. In this case, the output signal of the first frequency synthesizer serves as the local signal. The second frequency divider uses a division ratio other than 1.

Likewise, when the division ratio of the second frequency divider is 1, the second frequency divider may be constituted of a line that transmits the output signal of the second frequency synthesizer to the mixer in this case, the output signal of the second frequency synthesizer serves as the RF interfering signal. The first frequency divider uses a division ratio other than 1.

Preferably, the DC offset calibration system according to the first aspect may be constituted as follows. For example, the first frequency synthesizer includes a first voltage control oscillator, a third frequency divider that divides the frequency of an output signal of the first voltage control oscillator, a first phase comparator that compares an output signal of the third frequency divider and a reference phase signal to thereby output a signal proportionate to a phase difference, a first charge pump that converts the output signal of the first phase comparator to a current signal, and a first low pass filter that smoothens the current signal of the first charge pump and outputs a first control signal to a control terminal of the first voltage control oscillator. Likewise, the second frequency synthesizer includes a second voltage control oscillator, a fourth frequency divider that divides the frequency of an output signal of the second voltage control oscillator, a second phase comparator that compares an output signal of the fourth frequency divider and a reference phase signal to thereby output a signal proportionate to a phase difference, a second charge pump that converts the output signal of the second phase comparator to a current signal, and a second low pass filter that smoothens the current signal of the second charge pump and outputs a second control signal to a control terminal of the second voltage control oscillator. The DC offset calibration system according to the first aspect may further comprise a fifth frequency divider that divides the frequency of a reference signal, to thereby generate at least one of the reference phase signals for the first the second phase comparator.

In this configuration, it is preferable that o the reference signal is employed as one of the reference phase signals of the first and the second phase comparators, and the output signal of the fifth frequency divider as the other.

The DC offset calibration system according to the second aspect comprises a plurality of mixers, each of the mixers that mixes a local signal and a RF interfering signal thus to output an IF signal; a plurality of DC offset correctors, each of the mixers that detects a level of the RF interfering signal with respect to each of the mixers and outputs a correction signal to correct a DC offset contained in the IF signal to the respective mixers thus to cancel the DC offset; a first and a second frequency synthesizers; a first frequency divider that divides the frequency of an output signal of the first frequency synthesizer and generates different local signals to be input to each of the plurality of mixers; and a second frequency divider that divides the frequency of an output signal of the second frequency synthesizer and generates different RF interfering signals to be input to each of the mixers, to thereby operate in a plurality of bands. With respect to each of the mixers, the first frequency divider and the second frequency divider have different division ratios.

In the DC offset calibration system according to the second aspect, local signal input to a part or the whole of the plurality of mixers may be the output signal of the first frequency synthesizer as it is.

Likewise, in the DC offset calibration system according to the second aspect, the RF interfering signal input to a part or the whole of the plurality of mixers may be the output signal of the second frequency synthesizer as it is.

Also, preferably, the DC offset calibration system according to the second aspect may be constituted as follows. For example, the first frequency synthesizer includes a first voltage control oscillator, a third frequency divider that divides the frequency of an output signal of the first voltage control oscillator, a first phase comparator that compares an output signal of the third frequency divider and a reference phase signal to thereby output a signal proportionate to a phase difference, a first charge pump that converts the output signal of the first phase comparator to a current signal, and a first low pass filter that smoothens the current signal of the first charge pump and outputs a first control signal to a control terminal of the first voltage control oscillator. Likewise, the second frequency synthesizer includes a second voltage control oscillator, a fourth frequency divider that divides the frequency of an output signal of the second voltage control oscillator, a second phase comparator that compares an output signal of the fourth frequency divider and a reference phase signal to thereby output a signal proportionate to a phase difference, a second charge pump that converts the output signal of the second phase comparator to a current signal, and a second low pass filter that smoothens the current signal of the second charge pump and outputs a second control signal to a control terminal of the second voltage control oscillator. The DC offset calibration system according to the first aspect may further comprise a fifth frequency divider that divides the frequency of a reference signal, to thereby generate at least one of the reference phase signals for the first and the second phase comparators.

In this configuration, it is preferable that o the reference signal is employed as one of the reference phase signals of the first and the second phase comparators, and the output signal of the fifth frequency divider as the other.

Further, in the DC offset calibration system according to the second aspect, the second frequency synthesizer may have a fixed oscillating frequency.

As described above, the DC offset calibration system according to the present invention permits neglecting the influence of an output signal or spurious of one of the frequency synthesizers to the other. Therefore, the present invention provides a small and inexpensive DC offset calibration system capable of precisely performing the DC offset calibration.

DETAILED DESCRIPTION OF THE INVENTION

Hereunder, embodiments of the present invention will be described referring to the accompanying drawings.

Figure 1:
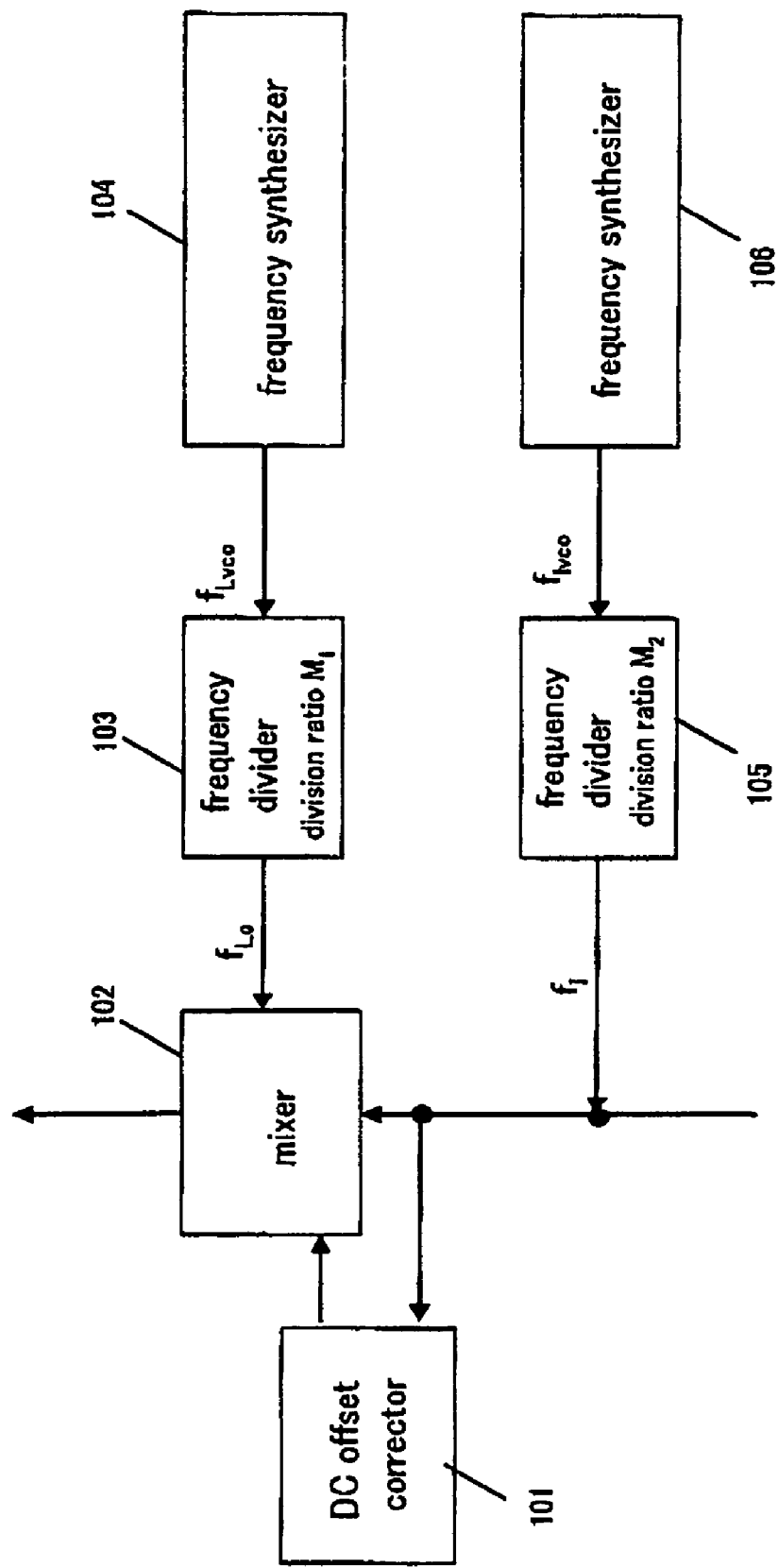
FIG. 1 is a block diagram showing a basic configuration of a DC offset calibration system according to a first embodiment of the present invention.

Referring first to FIG. 1, a first embodiment of the present invention will be described. A frequency divider 103 divides the frequency of a frequency signal $f_{Lvco}$ of a frequency synthesizer 104 at a division ratio $M_1$, to thereby output a frequency signal $f_{Lo}$ and input the frequency signal $f_{Lo}$ to a mixer 102 as a local signal.

Figure 6:
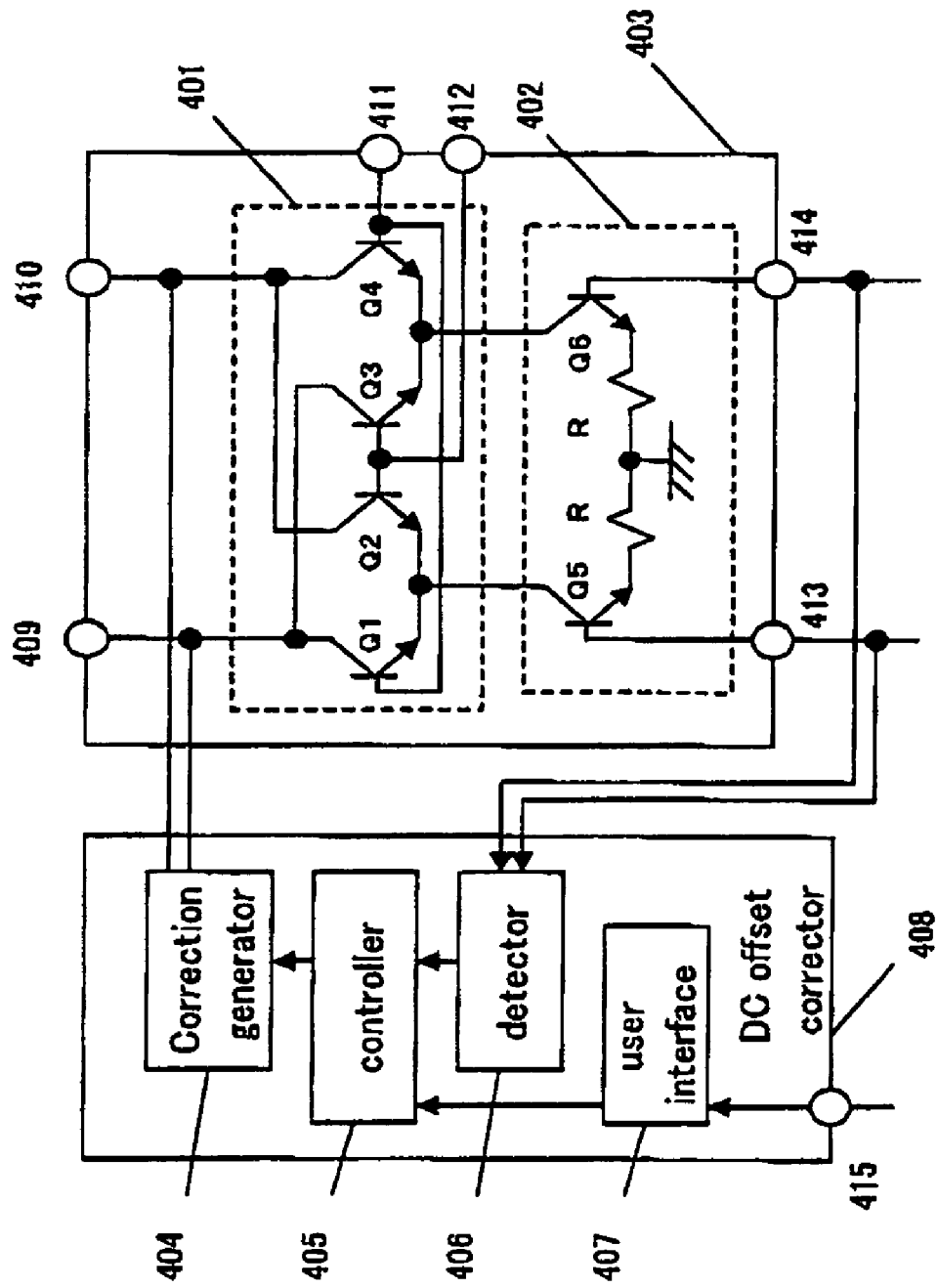
FIG. 6 is a block diagram showing an internal circuit configuration of a conventional DC offset calibration system.

Likewise, a frequency divider 105 divides the frequency of a frequency signal $f_{Ivco}$ of a frequency synthesizer 106 at a division ratio $M_2$, to thereby output a frequency signal $f_I$ and input the frequency signal $f_I$ to the mixer 102 and a DC offset corrector 101 as a RF interfering signal. The DC offset corrector 101 has a similar configuration to FIG. 6.

Here, the relation among the local signal $f_{Lo}$, the frequency signal $f_{Lvco}$ and the division ratio $M_1$, as well as among the interfering signal $f_I$, the frequency signal $f_{Ivco}$ and the division ratio $M_2$ can be defined as the following formulas (1) and (2).

$$f_{Lo}=f_{Lvco}/M_1 \quad (1)$$

$$f_I=f_{Ivco}/M_2 \quad (2)$$

It is to be assumed that a radio system standard adopted in this embodiment permits an interfering signal up to an offset frequency of a desired signal $f_d$.

In order to precisely perform the DC offset calibration under such condition, it is preferable to set as follows.

$$|f_{LO}-f_I|\cong f_d \quad (3)$$

However, most radio standards specify as;

$$f_{LO}\cong f_I>>f_d \quad (4)$$

$\cong$: nearly equal

Accordingly, the interference between the two frequency synthesizers 104 and 106 incurs degradation of the C/N characteristic. This impedes precisely performing the DC offset calibration.

Therefore, according to the first aspect of the present invention, the division ratio $M_1$ of the frequency divider 103 for generating the local signal $f_{Lo}$ and the division ratio $M_2$ of the frequency divider 105 for generating the interfering signal $f_I$ are set to be different values. Since $M_1 \neq M_2$ leads to $f_{Lvco} \neq f_{Ivco}$, the interference between the two frequency synthesizers 104 and 106 can be eliminated. Consequently, the respective frequency synthesizers 104, 106 achieve an excellent C/N characteristic. It is obvious that achieving an excellent C/N characteristic in the frequency signals $f_{Lvco}$ and $f_{Ivco}$ is essential for precisely performing the DC offset calibration.

Further, appropriately selecting the division ratio $M_1$, $M_2$, and difference in frequency $|f_{Lo}-f_I|$ allows minimizing an interference of a spurious from one of the frequency synthesizers such as secondary harmonics or reference leak to the other. This is also obviously indispensable for precisely performing the DC offset calibration, like the foregoing condition.

Further, omitting one of the frequency dividers 103 and 105 is equivalent to setting either of the division ratios $M_1$ or $M_2$ to be 1 in the first embodiment, and hence the foregoing description equally applies. For example, when the division ratio of the frequency divider 103 is 1, the frequency divider 103 may be constituted of a line that transmits the output signal of the frequency synthesizer 104 to the mixer 102. Likewise, when the division ratio of the frequency divider 105 is 1, the frequency divider 105 may be constituted of a line that transmits the output signal of the frequency synthesizer 106 to the mixer 102.

Now referring to FIG. 2, a second embodiment of the present invention will be described. The frequency synthesizer 104 that generates the local signal $f_{LO}$ includes a voltage control oscillator (VCO) 201, a variable frequency divider 202 that divides the frequency of that signal, a phase comparator (PD) 203 that compares an output signal of the variable frequency divider 202 and a phase comparison reference signal $f_{REFd}$ so as to output a signal proportionate to the phase difference, a charge pump (CP) 205 that converts the signal from the phase comparator 205 into a current, and a low pass filter (LPF) 206 that smoothens the output signal of the charge pump 205 and outputs the smoothened signal to a control terminal of the voltage control oscillator 201 as a control signal.

Likewise, the frequency synthesizer 106 that generates the interfering signal $f_I$ includes a voltage control oscillator 207, a frequency divider 208 that divides the frequency of that signal, a phase comparator 209 that compares an output signal of the frequency divider 208 and a phase comparison reference signal $f_{REFd}$ so as to output a signal proportionate to the phase difference, a charge pump 210 that converts the signal from the phase comparator 209 into a current, and a low pass filter 211 that smoothens the output signal of the charge pump 210 and outputs the smoothened signal to a control terminal of the voltage control oscillator 207 as a control signal.

The frequency divider 208 may be either of a variable frequency divider or a fixed frequency divider. It is an object of the first embodiment to achieve the state of $f_{Lvco} \neq f_{Ivco}$, which is achieved by arranging the frequency divider 103 and the frequency divider 105 ($M_1 \neq M_2$). This can be achieved regardless of whether the frequency divider 208 is variable or fixed.

A feature of the second aspect of the present invention is that the identical phase comparison reference signal $f_{REF_d}$ is employed for the two independent frequency synthesizers 104, 106. In FIG. 2, the reference signal $f_{REF}$ is divided by the frequency divider 204, and the phase comparison reference signal $f_{REF_d}$ is input to the phase comparators 203, 209.

This eliminates the need to individually generate the phase comparison reference signal $f_{REF_d}$ for each of the frequency synthesizers 104, 106. This allows reducing the circuit scale, and hence providing a small and inexpensive DC offset calibration system.

Figure 2:
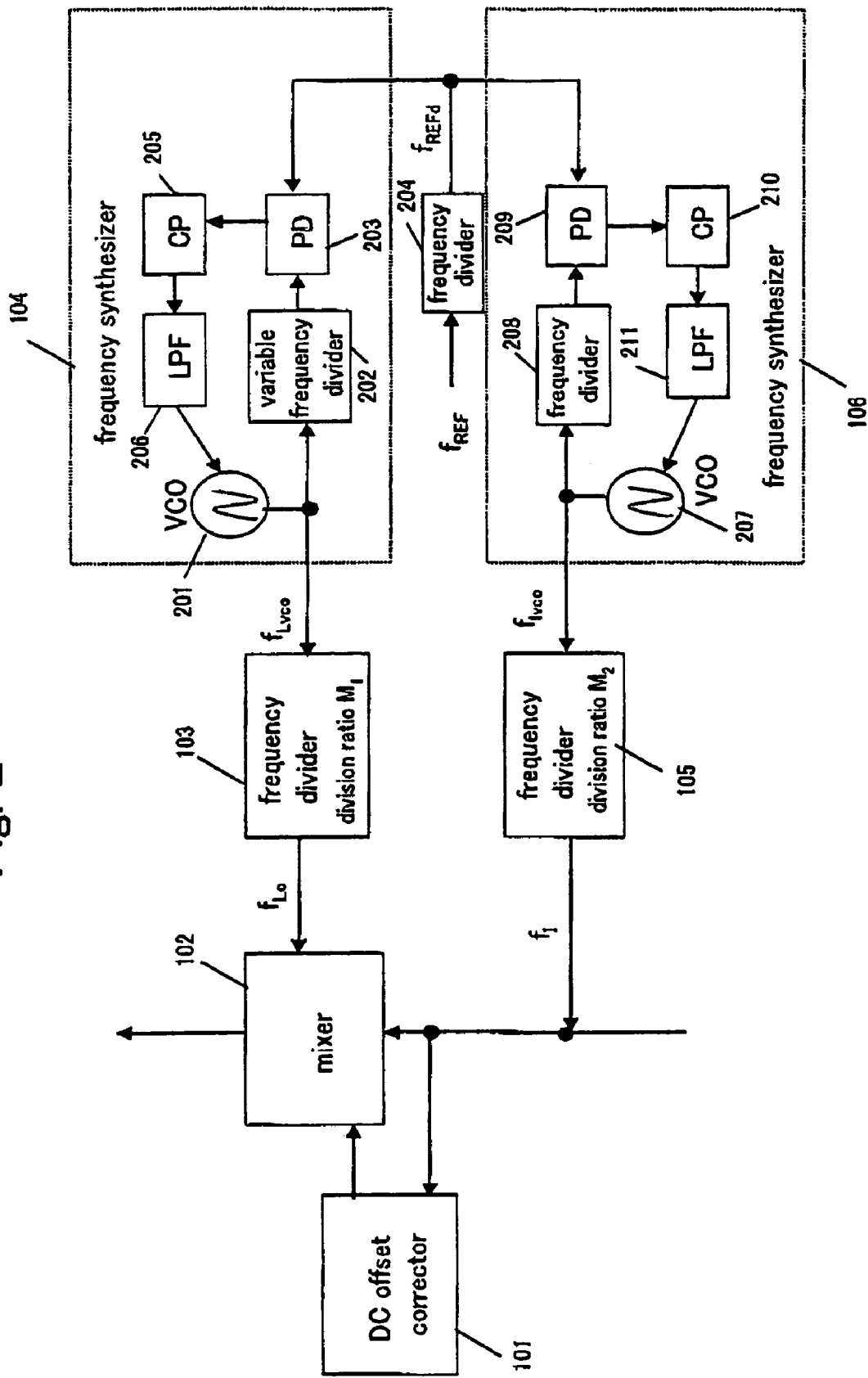
FIG. 2 is a block diagram showing a basic configuration of a DC offset calibration system according to a second embodiment of the present invention.

In addition to the configuration as shown in FIG. 2, appropriately selecting the division ratios $M_1$, $M_2$, local signal $f_{Lo}$ and the interfering signal $f_I$ so as to use the reference signal $f_{REF}$ as it is without dividing for either of the phase comparators 203 or 209 also enables reducing the circuit scale, to thereby provide a small and inexpensive DC offset calibration system.

Figure 3:
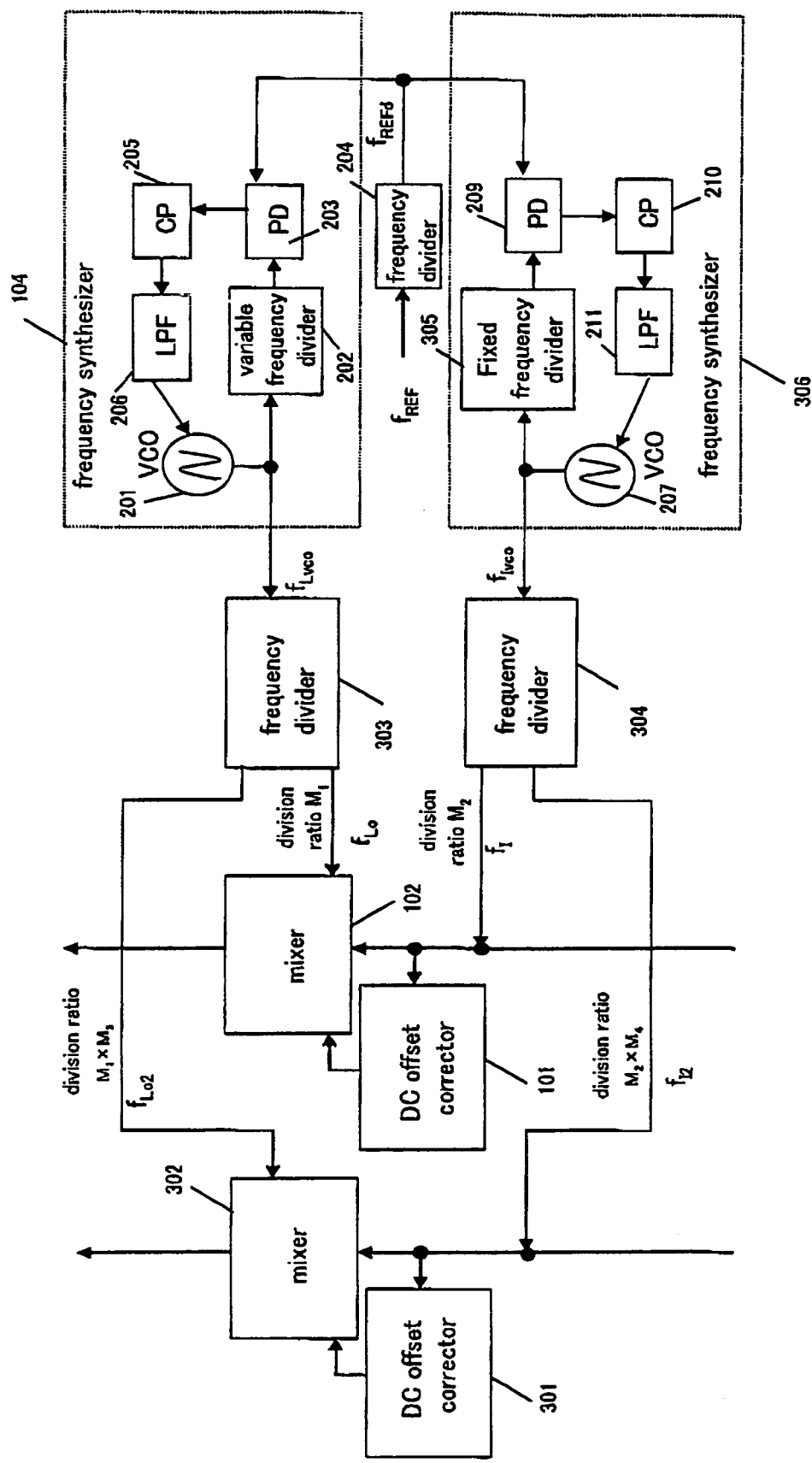
FIG. 3 a block diagram showing a basic configuration of a DC offset calibration system according to a third embodiment of the present invention.
Figure 4:
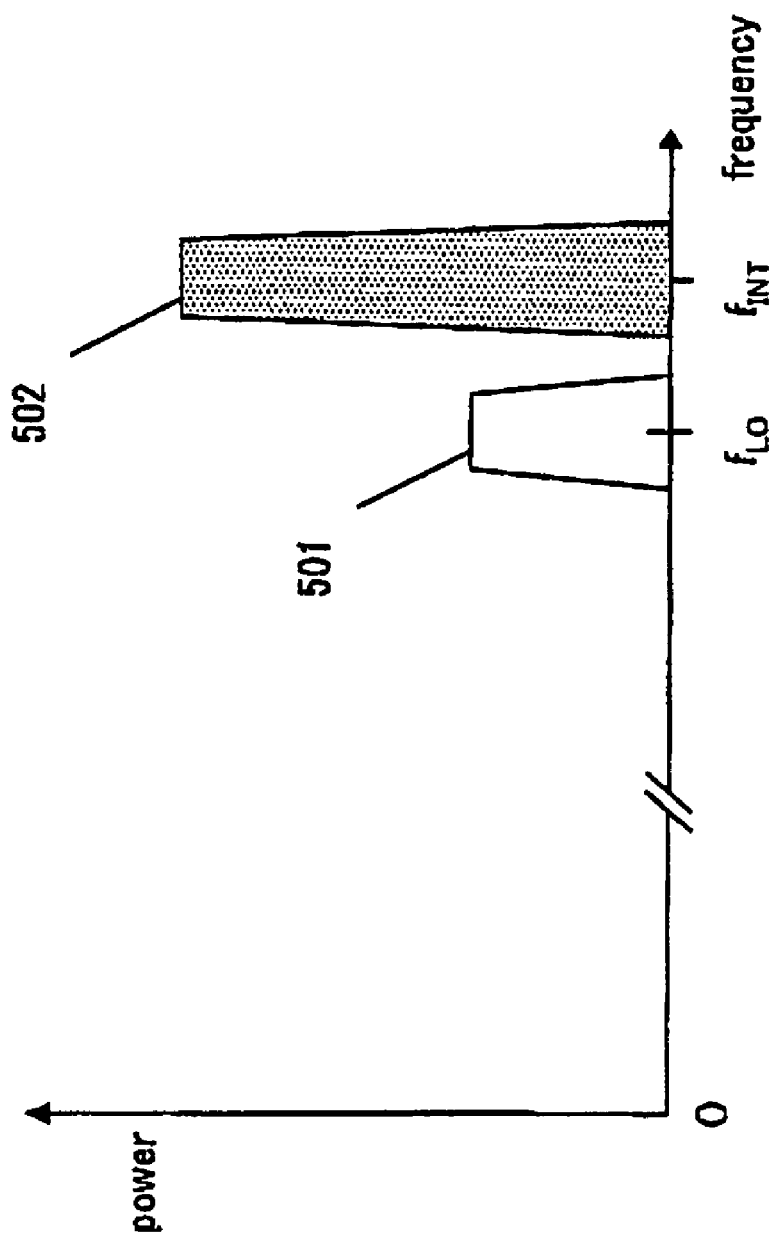
FIG. 4 is a graph showing a spectrum of a mixer input signal.
Figure 5:
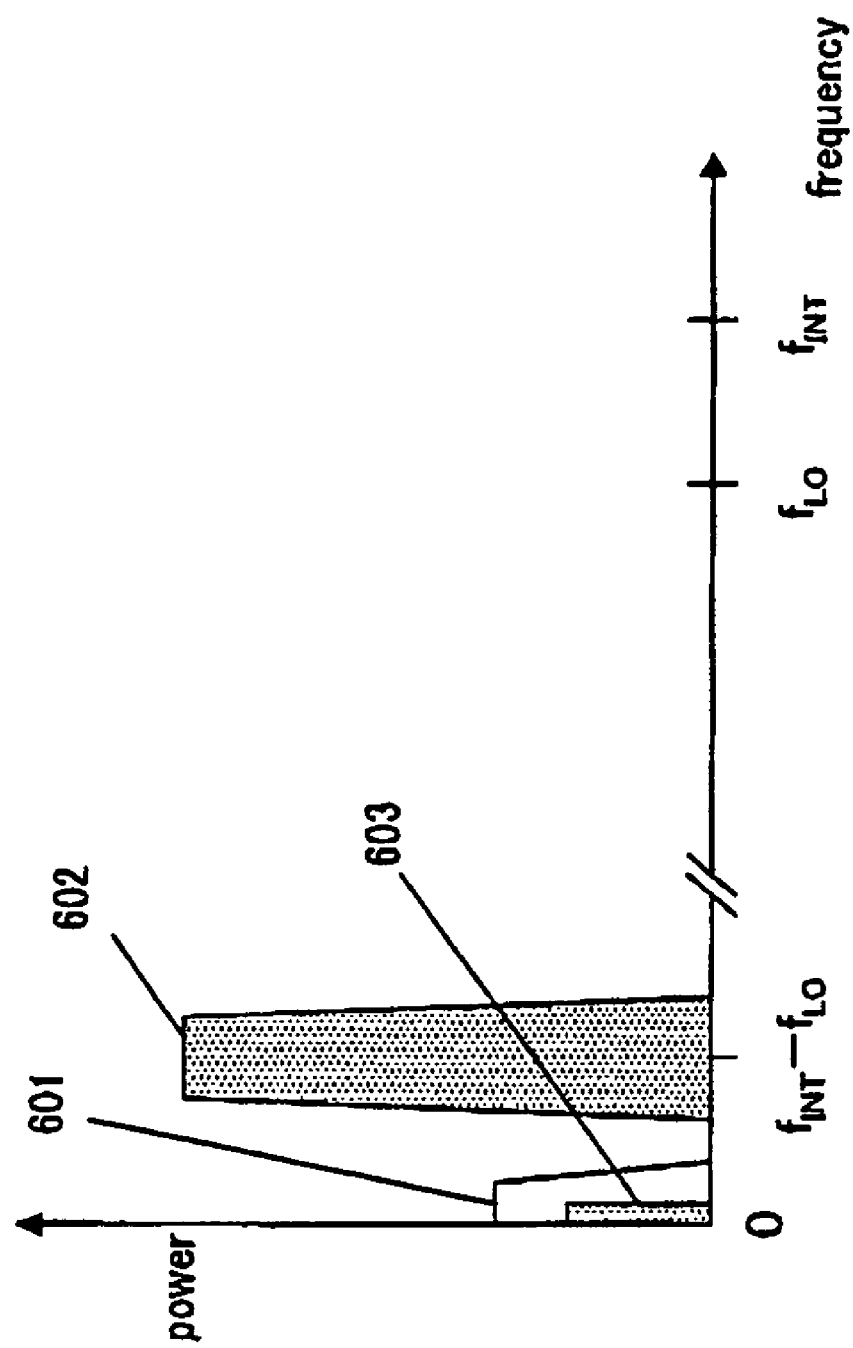
FIG. 5 is a graph showing a spectrum of a mixer input signal not subjected to DC offset correction.

FIG. 3 shows a configuration of a compatible with a dual band device, according to a third embodiment of the present invention; This DC offset calibration system includes two mixers 102, 302 to handle two different bands namely a band 1 and a band 2, and the respective mixers 102, 302 include a DC offset corrector 101, 301. The DC offset correctors 101, 301 have a similar configuration to FIG. 6. The mixers 102, 302 receive a local signal $f_{Lo}$, $f_{Lo2}$, and an interfering signal $f_I$, $f_{I2}$ respectively. The mixer 102 corresponds to the band 1, and the mixer 302 corresponds to the band 1.

A feature of the third aspect of the present invention is that a frequency synthesizer 306 that generates $f_I$ and $f_{I2}$ as an interfering signal does not have a frequency switching function. In other words, the frequency synthesizer 306 is the same as the frequency synthesizer 106 in FIG. 2, but with a fixed frequency divider 305 instead of the frequency divider 208. Also, frequency dividers 303, 304 are employed in place of the frequency divider 103, 105 in FIG. 2. The frequency divider 303 divides the frequency signal $f_{Lvco}$ at the division ratio of $M_1$ and $M_1 \times M_3$ respectively. Likewise, frequency divider 304 divides the frequency signal $f_{Ivco}$ at the division ratio of $M_2$ and $M_2 \times M_4$ respectively.

According to this embodiment, eliminating a complicated frequency switching function allows simplifying the structure of the frequency synthesizer, and thereby providing a small and inexpensive DC offset calibration system.

The same signals employed in the foregoing description are also employed in FIG. 3, so as to constitute a portion corresponding to the band 1.

For a portion corresponding to the band 2, the following codes are newly given so as to define the relation among the local signal $f_{Lo2}$, the frequency signal $f_{Lvco}$ and division ratios $M_1$, $M_3$ as well as among the interfering signal $f_{I2}$, frequency signal $f_{Ivco}$ and division ratios $M_2$, $M_4$ as the following formulas, similarly to the foregoing formulas (1), (2) and (3).

$$f_{Lo2} = f_{Lvco}/(M_1 \times M_3) \quad (5)$$

$$f_{I2} = f_{Ivco}/(M_2 \times M_4) \quad (6)$$

wherein at least either of $M_3$ or $M_4$ is not 1.

It is to be assumed that a radio system standard corresponding to the band 2 permits an interfering signal up to an offset frequency of a desired signal $f_{d2}$.

In order to precisely perform the DC offset calibration under such condition, it is preferable to set as follows.

$$|f_{Lo2} - f_{I2}| \cong f_{d2} \quad (7)$$

As the formula (4), most radio standards specify as:

$$f_{Lo2} \cong f_{I2} >> f_{d2} \quad (8)$$

Meanwhile, the formulas (1) and (5), as well as (2) and (6) respectively leads to the following formulas (9) and (10)

$$f_{Lo} = f_{Lo2} \times M_3 \quad (9)$$

$$f_I = f_{I2} \times M_4 \quad (10)$$

Substitution of the formula (3) with the formulas (9), (10) provides;

$$|f_{Lo2} \times M_3 - f_{I2} \times M_4| \cong f_d \quad (11)$$

Here, for precisely perform the DC offset calibration, the offset frequency $f_d$, $f_{d2}$ should not be excessively distant from a standard value of the respective bands.

The formulas (7) and (10) indicate that the oscillation frequencies of the $f_{Lvco}$ and $f_{Ivco}$ have to be switched when performing the DC offset calibration in the respective bands, according to the radio standards corresponding to the band 1 and the band 2.

Now, in order to receive desired signals of different frequencies under the direct conversion system, it is imperative that the frequency synthesizer 104, which serves to generate the local signal $f_{Lo}$ and $f_{Lo2}$, is provided with an oscillation frequency switching function.

Accordingly, the following formulas are led out from the formulas (3) and (7).

$$|f_{Lvco2}/(M_1 \times M_3) - f_{Ivco}/(M_2 \times M_4)| = |f_{Lo2} - f_{I2}| \cong f_{d2} \quad (13)$$

$$|f_{Lvco1}/M_1 - f_{Ivco}/M_2| = |f_{Lo} - f_I| \cong f_d \quad (14)$$

Wherein the code $f_{Lvco1}$ stands for the oscillation frequency of the frequency synthesizer 104 while the mixer 102 is performing the DC offset calibration, and the code $f_{Lvco2}$ stands for the oscillation frequency of the frequency synthesizer 306 while the mixer 102 is performing the DC offset calibration.

Selecting the oscillation frequencies $f_{Lvco1}$, and $f_{Lvco2}$ so as to satisfy the formulas (13), (14) permits eliminating the frequency switching function of the frequency signal $f_{Ivco}$ frequency, thus achieving the third aspect of the present invention.

Also, the fixed frequency divider 305 serves to select a simple division ratio without employing a known technique such as a pulse swallow function, thereby facilitating further reducing the size and cost of the DC offset calibration system.

Further, while the third embodiment relates to the dual band system, the present invention can provide similar advantages when applied to a system that handles three or more bands.

Further, in this embodiment, the output signal of the first frequency synthesizer may be used as it is, as the local signal to be input to a part or the whole of the plurality of mixers. Likewise, the output signal of the second frequency synthesizer may be used as it is, as the RF interfering signal to be input to a part or the whole of the plurality of mixers.

Still further, in this embodiment also, using the reference signal $f_{REF}$ as it is without dividing for either of the phase comparators 203 or 209 enables reducing the circuit scale, to thereby provide a small and inexpensive DC offset calibration system, as in the second embodiment.

Finally, specific values applicable to the foregoing constituents and signals in the first, the second and the third embodiment are shown in the following Tables 1 and 2, with respect to a GSM/DCS dual band system configured as FIG. 3. It is to be noted that those values are only exemplary, and that the present invention is not limited to those values.

TABLE 1

Items having a different value depending on bands, among specific exemplary values in the embodiments of the present invention

| Item | Band 1 | Band 2 |
|---|---|---|
| Radio standard | DCS | GSN |
| Mixer that performs correction | Mixer 102 | Mixer 302 |
| Minimum offset frequency of desired signal and interfering signal according to radio standards | $f_d = 6$ MHz | $f_{d2} = 6$ MHz |
| Local signal when performing DC offset calibration | $f_{Lo} = 1890$ MHz | $f_{Lo2} = 954$ MHz |
| Oscillating frequency of frequency synthesizer 104 when performing DC offset calibration | $f_{Lvoo1} = 3780$ MHz | $f_{Lvoo2} = 3816$ MHz |
| Interfering signal when performing DC offset calibration | $f_1 = 936$ MHz | $f_{12} = 1872$ MHz |

TABLE 2

Items common to the bands among specific exemplary values in the embodiments of the present invention

| | |
|---|---|
| Oscillating frequency of frequency synthesizer 306 when performing DC offset calibration | $f_{Ivoo} = 2808$ MHz |
| Offset frequency of desired signal and interfering signal when performing DC offset calibration | 18 MHz |
| Phase comparison reference signal of frequency synthesizers 104 and 306 | $f_{REF\ d} = 13$ MHz |
| Division ratio of frequency divider 103 | $M_1 = 2$ |
| Division ratio of frequency divider 105 | $M_2 = 2/3$ |
| Division ratio of frequency divider 303 | $M_3 = 2$ |
| Division ratio of frequency divider 304 | $M_4 = 2$ |

INDUSTRIAL APPLICABILITY

As described throughout the foregoing passages, the present invention is quite useful for correcting a DC offset generated in a mixer output signal when an interfering signal is input, in a radio receiver of the direct conversion system.

What is claimed is:

1. A DC offset calibration system, comprising:
a mixer that mixes a local signal and a RF interfering signal thus to output an IF signal;
a DC offset corrector that detects a level of the RF interfering signal and outputs to the mixer a correction signal to correct a DC offset contained in the IF signal to thereby cancel the DC offset;
a first and a second frequency synthesizers;
a first frequency divider that divides the frequency of an output signal of the first frequency synthesizer to thereby generate the local signal and outputs the local signal to the mixer; and
a second frequency divider that divides the frequency of an output signal of the second frequency synthesizer to thereby generate the RF interfering signal and outputs the RF interfering signal to the mixer;
wherein the first frequency divider and the second frequency divider have different division ratios.

2. The DC offset calibration system according to claim 1, wherein the division ratio of the first frequency divider is 1, and the first frequency divider is constituted of a line that transmits the output signal of the first frequency synthesizer to the mixer.

3. The DC offset calibration system according to claim 1, wherein the division ratio of the second frequency divider is 1, and the second frequency divider is constituted of a line that transmits the output signal of the second frequency synthesizer to the mixer.

4. The DC offset calibration system according to claim 1, wherein the first frequency synthesizer includes a first voltage control oscillator, a third frequency divider that divides the frequency of an output signal of the first voltage control oscillator, a first phase comparator that compares an output signal of the third frequency divider and a reference phase signal to thereby output a signal proportionate to a phase difference, a first charge pump that converts the output signal of the first phase comparator to a current signal, and a first low pass filter that smoothens the current signal of the first charge pump and outputs a first control signal to a control terminal of the first voltage control oscillator; and
the second frequency synthesizer includes a second voltage control oscillator, a fourth frequency divider that divides the frequency of an output signal of the second voltage control oscillator, a second phase comparator that compares an output signal of the fourth frequency divider and a reference phase signal to thereby output a signal proportionate to a phase difference, a second charge pump that converts the output signal of the second phase comparator to a current signal, and a second low pass filter that smoothens the current signal of the second charge pump and outputs a second control signal to a control terminal of the second voltage control oscillator;
the DC offset calibration system further comprising a fifth frequency divider that divides the frequency of a reference signal, to thereby generate at least one of the reference phase signals for the first and the second phase comparators.

5. The DC offset calibration system according to claim 4, wherein the reference signal is employed as one of the reference phase signals of the first and the second phase comparators, and the output signal of the fifth frequency divider as the other.

6. A DC offset calibration system, comprises a plurality of mixers, each of the mixers that mixes a local signal and a RF interfering signal thus to output an IF signal; a plurality of DC offset correctors, each of the mixers that detects a level of the RF interfering signal with respect to each of the mixers and outputs a correction signal to correct a DC offset contained in the IF signal to the respective mixers thus to cancel the DC offset; a first and a second frequency synthesizers; a first frequency divider that divides the frequency of an output signal of the first frequency synthesizer and generates different local signals to be input to each of the plurality of mixers; and a second frequency divider that divides the frequency of an output signal of the second frequency synthesizer and generates different RF interfering signals to be input to each of the mixers, to thereby operate in a plurality of bands;

wherein the first frequency divider and the second frequency divider have different division ratios, with respect to each of the mixers.

7. The DC offset calibration system according to claim 6, wherein local signal input to a part or the whole of the plurality of mixers is the output signal of the first frequency synthesizer.

8. The DC offset calibration system according to claim 6, wherein the RF interfering signal input to a part or the whole of the plurality of mixers is the output signal of the second frequency synthesizer.

9. The DC offset calibration system according to claim 6, wherein the first frequency synthesizer includes a first voltage control oscillator, a third frequency divider that divides the frequency of an output signal of the first voltage control oscillator, a first phase comparator that compares an output signal of the third frequency divider and a reference phase signal to thereby output a signal proportionate to a phase difference, a first charge pump that converts the output signal of the first phase comparator to a current signal, and a first low pass filter that smoothens the current signal of the first charge pump and outputs a first control signal to a control terminal of the first voltage control oscillator; and the second frequency synthesizer includes a second voltage control oscillator, a fourth frequency divider that divides the frequency of an output signal of the second voltage control oscillator, a second phase comparator that compares an output signal of the fourth frequency divider and a reference phase signal to thereby output a signal proportionate to a phase difference, a second charge pump that converts the output signal of the second phase comparator to a current signal, and a second low pass filter that smoothens the current signal of the second charge pump and outputs a second control signal to a control terminal of the second voltage control oscillator;

the DC offset calibration system further comprising a fifth frequency divider that divides the frequency of a reference signal, to thereby generate at least one of the reference phase signals for the first and the second phase comparators.

10. The DC offset calibration system according to claim 9, wherein the reference signal is employed as one of the reference phase signals of the first and the second phase comparators, and the output signal of the fifth frequency divider as the other.

11. The DC offset calibration system according to claim 6, wherein the second frequency synthesizer has a fixed oscillating frequency.

* * * * *